United States Patent [19]
Dieringer

[11] Patent Number: 5,970,710
[45] Date of Patent: Oct. 26, 1999

[54] MASTER CYLINDER FOR A VEHICLE HYDRAULIC BRAKING SYSTEM

[75] Inventor: Werner Dieringer, Vallendar, Germany

[73] Assignee: Lucas Varity public limited company, United Kingdom

[21] Appl. No.: 09/196,304

[22] Filed: Nov. 19, 1998

Related U.S. Application Data

[63] Continuation of application No. PCT/EP97/02472, May 14, 1997.

[51] Int. Cl.⁶ .............................. B60T 11/08; F15B 7/04
[52] U.S. Cl. .................................................. 60/575
[58] Field of Search .............................. 60/545, 574, 575

[56] References Cited

U.S. PATENT DOCUMENTS

| | | | |
|---|---|---|---|
| 4,078,385 | 3/1978 | Zabadneh | 60/574 X |
| 4,582,365 | 4/1986 | Belart | 60/575 X |
| 4,643,489 | 2/1987 | Reinartz et al. | 60/575 X |
| 4,660,898 | 4/1987 | Steffes | 60/575 X |
| 4,703,978 | 11/1987 | Belart et al. | 60/582 X |
| 5,609,399 | 3/1997 | Feigel et al. | 303/113.4 |

FOREIGN PATENT DOCUMENTS

| | | | |
|---|---|---|---|
| 1037863 | 8/1958 | Germany | 60/574 |
| 2430167 | 1/1976 | Germany . | |
| 3619793 | 1/1987 | Germany . | |
| 3738589 | 5/1989 | Germany . | |
| 4338906 | 5/1995 | Germany . | |
| 57-147952 | 9/1982 | Japan | 60/574 |
| 58-202144 | 11/1983 | Japan | 60/575 |

*Primary Examiner*—John E. Ryznic
*Attorney, Agent, or Firm*—MacMillan, Sobanski & Todd, LLC

[57] ABSTRACT

A master cylinder (10) for a vehicle hydraulic braking system (12) has a housing (18) with a bore (20) formed therein. A piston (22) is guided in a sealing and displaceable manner in the bore (20) and is mechanically connected to a rod-like actuating element (26), by means of which an input force (F) can be transmitted to the piston (22) for pressure conversion. In the bore (20), the piston (22) bounds a pressure chamber (28) and a replenishing chamber (30) arranged on the actuating element side, and has a hydraulically active area (A). In order selectively to increase the pressure intensification of the master cylinder (10), a device (50) is provided which selectively provides a fluid connection between the pressure chamber (28) and the replenishing chamber (30). In the last-mentioned state, on account of the hydraulically active area (B) of the actuating element (26) being smaller than the hydraulically active area (A) of the piston (22), the pressure intensification of the master cylinder (10) is increased by the factor A/B.

9 Claims, 4 Drawing Sheets

FIG. 4

MASTER CYLINDER FOR A VEHICLE HYDRAULIC BRAKING SYSTEM

CROSS REFERENCE TO RELATED APPLICATIONS

This application is a continuation of International Application No. PCT/EP97/02472 filed May 14, 1997, which claims priority to German Patent Application No. 19620228.0 filed May 20, 1996.

BACKGROUND OF THE INVENTION

The invention relates to a master cylinder according to the preamble of claim 1, as is disclosed, for example, by DE-A-36 19 793. Such master cylinders are installed in millions in motor vehicles and are therefore generally known. They are usually coupled to a brake booster, which increases the actuating force introduced by a driver and thus ensures that the driver is able to apply high braking forces with a relatively low actuating force. The force that acts on the master cylinder during an actuation is accordingly composed of a foot force component, which is applied by the driver, and a component which is applied by the brake booster. The brake booster is often a vacuum brake booster.

Conventionally, brake boosters are dimensioned such that the maximum actuating force that can be applied by an average driver and increased by the brake booster is sufficient to lock all the wheels of a vehicle, even given high frictional values between wheel and roadway. The braking force distribution of a vehicle is normally designed in such a way that considerably more braking force is fed to the front wheels of the vehicle than to the rear wheels, in order to avoid premature locking of the rear wheels, which is favored by the relieving of load on the rear wheels on account of the dynamic axle-load displacement occurring during braking. For some time, many vehicles have also been equipped with antilock braking systems, which prevent the vehicle wheels locking during sharp braking and thus keep the vehicle steerable. Recently, such antilock braking systems have been used not only during braking but also during the usual driving operation, in order to prevent critical driving states, or at least to reduce their criticality by means of the targeted braking of individual vehicle wheels, or to avoid drive wheels spinning on slippery ground.

Expanded systems of this type have become known under the terms vehicle dynamics control system (VDC system) and traction control system (TC system). The last-mentioned systems are able to brake individual vehicle wheels even if the driver of the vehicle does not actuate the brake. Of course, this presupposes that the brake booster cooperating with the master cylinder can be actuated independently of the driver, in order, if necessary, i.e. for example upon detecting a driving state that is becoming critical or a driving wheel that is spinning, to be able to exert an actuating force on the master cylinder. In this connection, the problem occurs that the actuating force that can be applied by the brake booster on its own is under certain circumstances no longer adequate to produce a braking force that is necessary for braking individual vehicle wheels up to the locking limit. Although this problem can be solved to a certain extent by using correspondingly larger-dimensioned brake boosters, this rapidly reaches the limits, in particular in the case of relatively compact motor vehicles, on account of the installation space, which is limited there. To make things more difficult, the use of a VDC system takes place not during braking but during normal driving operation, where for example the dynamic axle-load displacement which relieves the load on the rear wheels does not occur. Within the context of control by the VDC system, therefore, in order to brake a rear wheel up to the locking limit, a considerably higher braking force is required than even in the case of sharp operational braking. The dynamic wheel load of the front wheel on the outside of a curve can also increase, as a result of the centrifugal force on the vehicle bodywork, which tends to the outer rim of the curve, such that the braking force necessary in order to lock said wheel lies above that which would be required to lock it during straight-line braking. This is similarly true for braking spinning, driven rear wheels within the context of control via a TC system. In particular in the case of vehicles that are equipped with VDC systems, but also in the case of those having a TC system, it is therefore possible, in normal driving operation, for states to occur in which the actuating force that is provided solely by the brake booster and acts on the master cylinder is no longer adequate to produce the braking pressure which is demanded by the VDC system or by the TC system in order to avoid or reduce the criticality of a critical driving state.

SUMMARY OF THE INVENTION

The invention is therefore based on the object of providing a master cylinder for a vehicle hydraulic braking system which, in cooperation with a given brake booster, selectively permits the production of higher braking pressures in a simple way.

According to the invention, this object is achieved by a master cylinder which has the features specified in claim 1. According to the invention, use is made of the fact that, normally, the piston arranged in the bore of the master cylinder has a hydraulically active area which is greater than the hydraulically active area of the actuating element displacing this piston. By selectively connecting the pressure chamber with the compensating chamber, which is arranged on the other side of the piston, that is to say is located on the side of the actuating element, it is possible for the pressure intensification of the master cylinder to be amplified in the ratio of the hydraulically active area of the piston to the hydraulically active area of the actuating element, since in the case of a fluid connection between pressure chamber and compensating chamber, the same fluid pressure always prevails in these two chambers and therefore, in the pressure chamber, it is still only the hydraulically active area of the actuating element that is decisive for the pressure intensification of the master cylinder. Accordingly, the amplification of the pressure intensification may be set by varying the hydraulically active area of the piston or the hydraulically active area of the actuating element within wide limits. If, for example, the actuating element has a diameter which is only half as large as the diameter of the piston, then when the pressure chamber is connected to the replenishing chamber, the pressure intensification of the master cylinder rises by the factor 4. Although the inventive amplification of the pressure intensification of the master cylinder is bought at the cost of the displaceable amount of fluid, this has no disadvantageous effect, since, within the context of vehicle dynamics control, it is mostly only a single vehicle wheel, but at most two vehicle wheels, that have to be braked, and the rest of the vehicle wheels are isolated hydraulically from the master cylinder during this process, for example by means of the solenoid valves of the braking pressure control system.

According to the invention, therefore, without an enlarged brake booster, by means of the device that selectively provides a fluid connection between the pressure chamber and the replenishing chamber, a higher braking pressure can be provided at individual vehicle wheels if the VDC system demands such a braking pressure. In normal operation, the connection between pressure chamber and replenishing chamber will mostly be blocked, however, since the above-mentioned high braking pressures, to be applied solely by the brake booster, are not needed in the context of normal operational braking. The master cylinder according to the present invention therefore functions for most of the time like a conventional master cylinder without an optional increase in the pressure intensification. If the fluid connection between the pressure chamber and the replenishing chamber is interrupted, the replenishing chamber, as is also the case with a conventional master cylinder, has a fluid connection to a supply container for hydraulic fluid. If, on the other hand, the pressure chamber and the replenishing chamber have a fluid connection to each other, then according to the invention the replenishing chamber is shut off from the supply container for hydraulic fluid.

It is preferable if the device for providing a fluid connection between the pressure chamber and replenishing chamber comprises an electrically actuatable valve which optionally blocks or clears the connection between the pressure chamber and the replenishing chamber. Advantageously, this valve is constructed as a changeover valve, which in its one position connects the replenishing chamber to the supply container for hydraulic fluid and, in its other position, connects it to the pressure chamber. In this other position, the changeover valve then simultaneously shuts off the replenishing chamber from the supply container for hydraulic fluid.

In order to avoid any lengthening of the brake pedal travel, which occurs in the embodiment just described, for example when a braking operation which is triggered independently of the driver by the VDC system and needs a high braking force, is immediately followed by a normal foot-braking action by the driver, according to a further modified embodiment of a master cylinder according to the present invention, a filling stage, which comprises a filling chamber and a filling piston accommodated therein, is connected upstream of the replenishing chamber. The filling chamber has a fluid connection, on the one hand, to the replenishing chamber via a nonreturn valve that opens in the actuating direction of the master cylinder, and, on the other hand, to a fluid reservoir assigned to the inlet side of a hydraulic pump. The delivery side of the hydraulic pump has a fluid connection to the pressure chamber. If the pressure chamber and replenishing chamber have a fluid connection to each other, hydraulic fluid can no longer be transferred from the filling chamber into the replenishing chamber, on account of the pressure building up in the replenishing chamber. Instead, the hydraulic fluid is led out of the filling chamber into the fluid reservoir on the suction side of the hydraulic pump. If the filling piston has a hydraulically active area which corresponds to the difference between the hydraulically active area of the piston and the hydraulically active area of the actuating element, it is ensured that the volume of fluid transferred from the filling chamber into the fluid reservoir corresponds precisely to that volume of fluid which is forced out of the pressure chamber into the replenishing chamber. Using such an arrangement, it is possible to avoid any lengthening of the actuating travel of the master cylinder, in spite of the increase in pressure intensification that is connected in, if the volume of fluid that passes from the filling chamber into the fluid reservoir is fed to the pressure chamber virtually without delay by means of the hydraulic pump. For this purpose, the hydraulic pump must be designed such that it starts up rapidly and can deliver at any time against the pressure prevailing in the pressure chamber. The fluid reservoir, which functions as an intermediate store, and the hydraulic pump do not have to be provided separately, since the usual braking pressure control systems already have these components.

Advantageously, in the case of the last-described embodiment of a master cylinder according to the present invention, the hydraulic pump is configured such that it is able to deliver into the pressure chamber only that volume of fluid which is forced from the filling chamber into the fluid reservoir during an actuation of the master cylinder. This may be achieved particularly simply by the hydraulic pump being of the non self-priming type. Assuming that the fluid reservoir on the suction side of the hydraulic pump is empty at the beginning of an actuation of the master cylinder, the hydraulic pump can then specifically deliver into the pressure chamber only the volume of fluid passing into the fluid reservoir during the actuation.

According to a preferred embodiment, the filling piston is rigidly coupled to the piston via the rod-like actuating element, at least in the actuating direction, so that an absolutely synchronous displacement of the piston and of the filling piston is ensured.

Corresponding to the two braking circuits which are usual nowadays in hydraulic braking systems for motor vehicles, preferred embodiments of the master cylinder according to the present invention have a second piston, which is designed as a floating piston, is guided in a sealing and displaceable manner in the master cylinder bore and, in the latter, bounds a second pressure chamber, in which the braking pressure for the second braking circuit is built up.

All the embodiments of the master cylinder according to the present invention are primarily provided for use with a brake booster that can be actuated independently of the driver, and which is in particular a vacuum brake booster. In the case of a vacuum brake booster, a driver-independent actuation can, for example, be realized simply by the control valve which controls the feed of atmospheric pressure into the working chamber of the brake booster being of an electromagnetically actuable design.

The device for providing a fluid connection between pressure chamber and replenishing chamber preferably comprises a controller which, if the brake booster is actuated independently of the driver, outputs a signal to produce the fluid connection between the pressure chamber and the replenishing chamber. In this case, the circuit may be such that the signal for producing the fluid connection takes place during a driver-independent actuation of the brake booster only when a braking pressure is demanded which cannot be provided without an amplification of the pressure intensification being activated. However, the circuit can also be designed such that the signal for producing the fluid connection is always output from the beginning when a driver-independent actuation of the brake booster takes place.

BRIEF DESCRIPTION OF THE DRAWINGS

Two exemplary embodiments of a master cylinder according to the present invention will be explained in more detail below with reference to the appended, schematic drawings, in which:

FIG. 4 shows the master cylinder from FIG. 3, but now with an amplification of the pressure intensification being activated.

DETAILED DESCRIPTION OF THE PREFERRED EMBODIMENT

Figure 1:
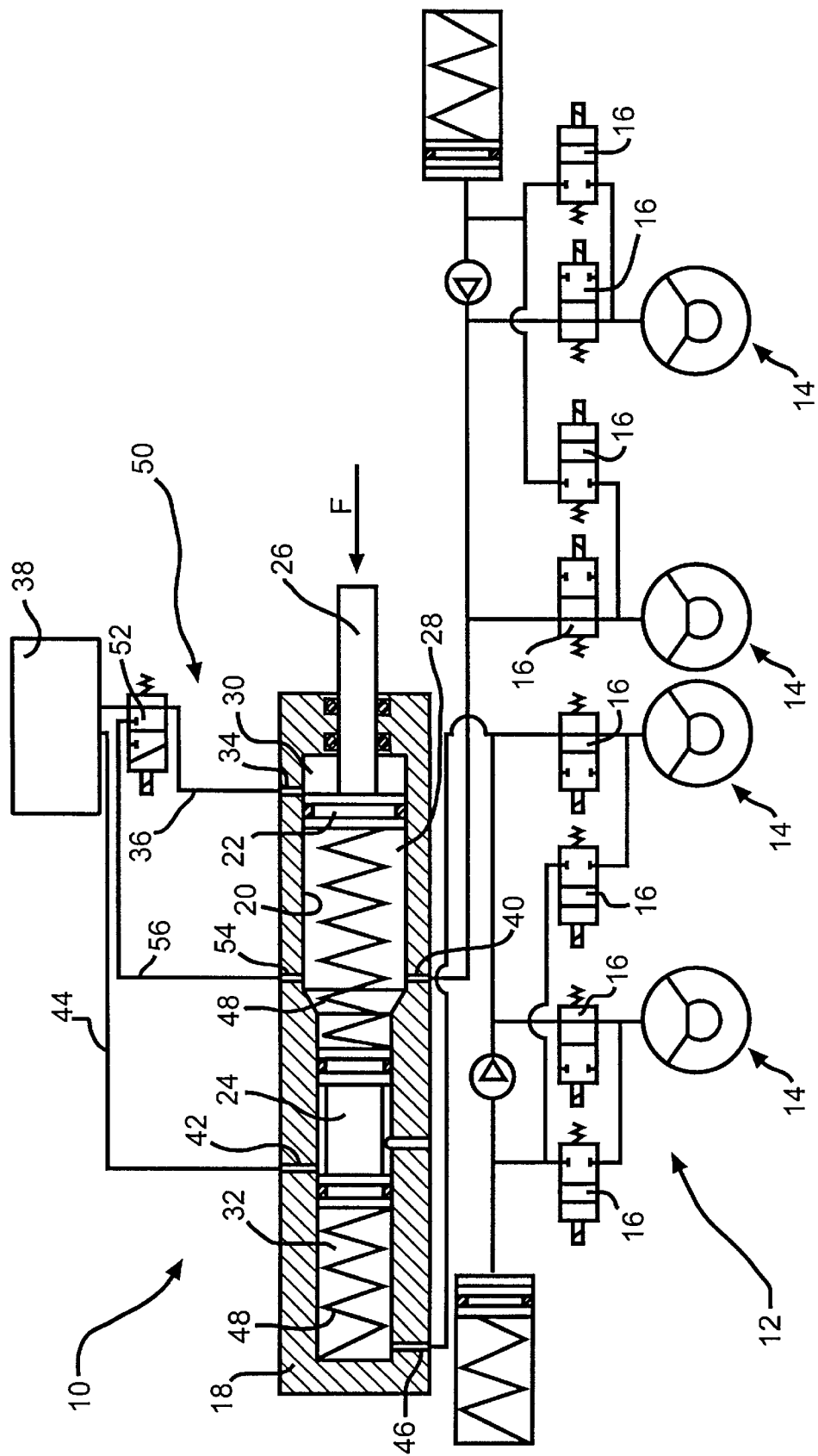
FIG. 1 shows a first exemplary embodiment, reproduced partly in section, of a master cylinder according to the present invention, which is connected to a conventional hydraulic braking system with an antilock braking system.
Figure 2:
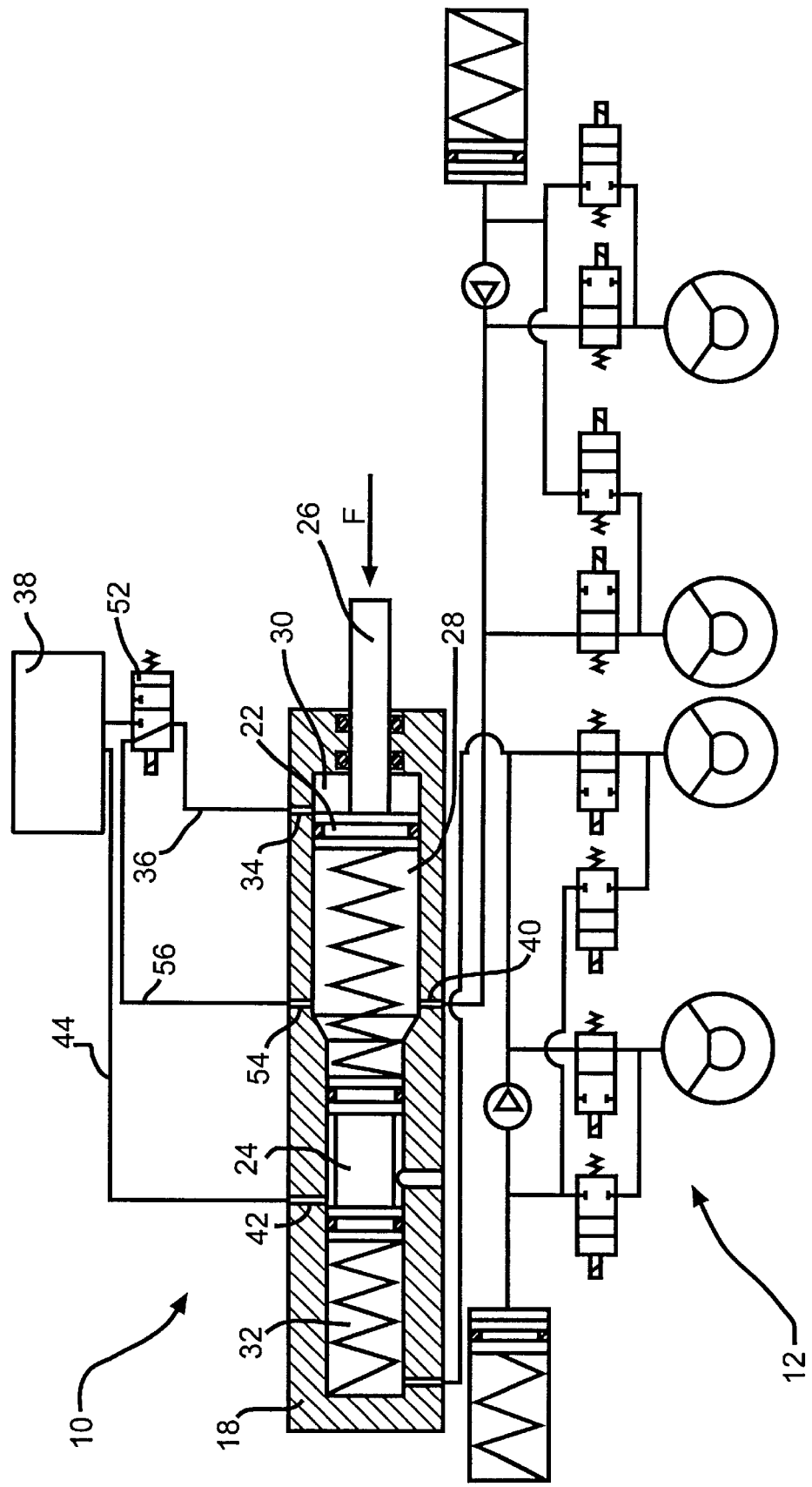
FIG. 2 shows the master cylinder from FIG. 1, but now with an amplification of the pressure intensification being activated.

FIG. 1 and FIG. 2 show in schematic form a first exemplary embodiment of a master cylinder 10 of a vehicle hydraulic braking system 12, which comprises four brakes 14, configured here as disk brakes, of which each is assigned to a vehicle wheel (not illustrated here), and each is equipped with an antilock braking system. Assigned to each brake 14 are two solenoid valves 16, so that the antilock braking system can build up, maintain or dissipate the braking pressure at each individual vehicle wheel, independently of the other vehicle wheels. The construction and the mode of operation of such antilock braking systems is generally known to persons skilled in the art, and therefore does not need to be explained further.

The master cylinder 10 has a generally elongate housing 18 with a bore 20 made therein, in which a piston 22, referred to below as the primary piston, and a piston 24, referred to below as the secondary piston and designed as a floating piston, are guided in a sealing and displaceable manner. The primary piston 22 is mechanically connected to a rod-like actuating element 26, which is guided in a sealing and displaceable manner through the wall of the housing 18 and projects from the housing 18 at the front end. The actuating element 26 permits an input force F to be transmitted to the primary piston 22. This input force F is produced partly by a brake booster (not illustrated here), which is mechanically coupled to the actuating element 26 and therefore can transmit the actuating force provided by said booster to the master cylinder 10. For its part, the brake booster is coupled in the usual way to a brake pedal (likewise not illustrated) of the vehicle braking system 12.

In the bore 20, the primary piston 22 defines firstly, together with the secondary piston 24, a first pressure chamber 28, which is assigned to a first braking circuit of the vehicle braking system 12, which is designed as a dual circuit system, and secondly a replenishing chamber 30, which, in relation to the primary piston 22, is located on the side of the actuating element 26. Furthermore, in the bore 20, the secondary piston 24 bounds a second pressure chamber 32, which is assigned to the second braking circuit of the vehicle braking system 12. When they are ready to operate, the two pressure chambers 28 and 32 and the replenishing chamber 30 are filled with hydraulic fluid.

In order to produce a braking pressure, the input force F is transmitted by the actuating element 26 to the primary piston 22, which is then displaced to the left in relation to FIG. 1. As soon as the primary piston 22 travels over a compensating bore 34, which, for pressure equalization purposes, in the starting position (not shown here) of the primary piston 22, connects the first pressure chamber 28 via a line 36 to a supply container 38 for hydraulic fluid, there builds up in the pressure chamber 28 a braking pressure which is proportional to the input force F and is fed to the first braking circuit via a pressure chamber outlet 40. Because of the pressure building up in the first pressure chamber 28, the secondary piston 24 is likewise displaced to the left, so that after traveling over a replenishing bore 42, which is assigned to the second pressure chamber 32 and, in a manner similar to the replenishing bore 34, is connected via a line 44 to the supply container 38 for hydraulic fluid, there also builds up in the second pressure chamber 32 a braking pressure which is proportional to the input force F and which is fed to the second braking circuit via a pressure chamber outlet 46. 48 designates two return springs, illustrated only schematically, which press the two pistons 22 and 24 back into their starting positions after the actuating or input force F has been discontinued. As soon as the two pistons 22 and 24 have traveled over the replenishing bores 34 and 42 in the reverse direction on the way to their starting positions, a pressure equalization with the atmosphere takes place in the pressure chambers 28 and 32 via the lines 36 and 44.

The pressure intensification achieved by the master cylinder 10 in relation to the input force F depends for the first braking circuit on the hydraulically active area A of the primary piston 22. In order selectively to achieve an increase in pressure intensification, given a predefined input force F and in spite of a geometrically predefined primary piston 22, the master cylinder 10 has a device 50, which can be used to provide a fluid connection between the first pressure chamber 28 and the replenishing chamber 30. For this purpose, the device 50 comprises a valve 52, which is arranged in the line 36 and can be driven electrically, as well as an overflow opening 54 in the first pressure chamber 28, to which opening a line 56 leading to the valve 52 is connected.

In a first position (see FIG. 1), the valve 52 shuts off the line 56 and clears the line 36, so that a fluid connection between the replenishing bore 34 and the supply container 38 is produced. This is the normal position of the valve 52, in which the pressure intensification of the master cylinder 10 is determined by the hydraulically active area A of the primary piston 22.

In a second position (see FIG. 2), the valve 52 shuts off the line 36 from the supply container 38 and instead connects said line to the line 56. In this way, after the primary piston 22 has traveled over the replenishing bore 34, a fluid connection is produced between the first pressure chamber 28 and the replenishing chamber 30, which is shut off from the atmosphere, so that the two chambers 28 and 30 form a communicating system from the point of view of the pressure prevailing in them. The pressure intensification of the master cylinder 10 in relation to the first pressure chamber 28 is then determined by the hydraulically active area B of the actuating element 26, which area is smaller than the area A, since a volume of fluid corresponding to the difference between the areas A and B is displaced from the first pressure chamber 28 into the replenishing chamber 38 during an actuation of the master cylinder 10, without acting so as to increase the braking pressure. With regard to this fluid volume component, a force equilibrium therefore prevails at the primary piston 22. Therefore, when the valve 52 is in the second position, it is possible for a braking pressure that is higher by the factor A/B to be achieved in the first pressure chamber 28, given the same input force F, but at the cost of a correspondingly larger displacement travel of the piston 22. This means that the output force of a given brake booster which can be actuated independently of the driver can optionally be converted into an increased braking pressure, without major design changes to the master cylinder 10 being necessary for this. The lengthened displacement travel of the piston 22 is not disadvantageous in connection with VDC systems, since as a rule braking pressure has to be fed to only a single brake 14, while the other brakes 14 are shut off hydraulically, so that the volume of fluid to be displaced in order to increase the pressure is very much lower than in the case of normal braking, in which all four brakes 14 have to be supplied with braking pressure.

Figure 3:
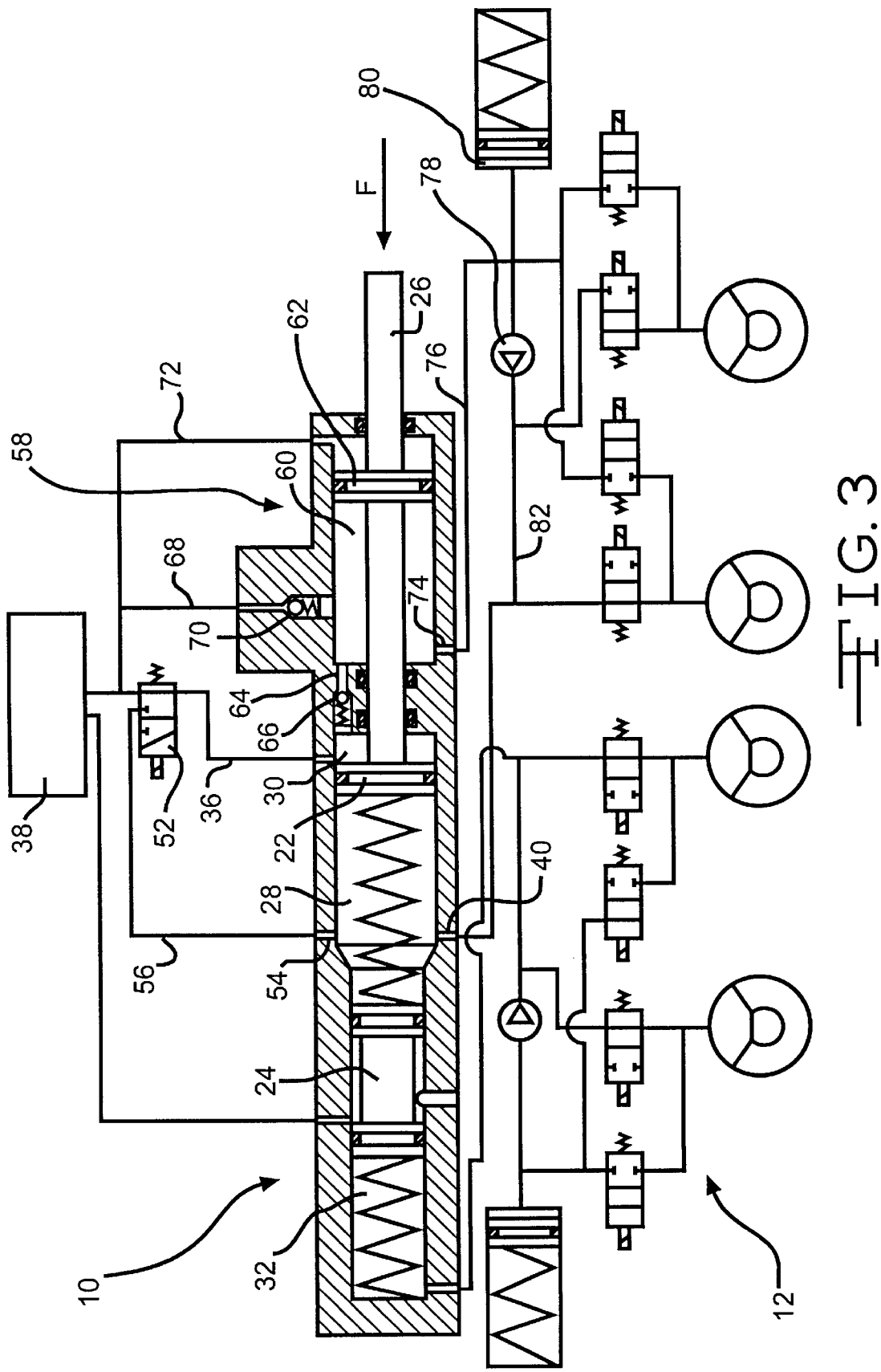
FIG. 3 shows a second exemplary embodiment, reproduced partly in section, of a master cylinder according to the present invention, which is connected to a vehicle hydraulic braking system with an antilock braking system.
Figure 4:
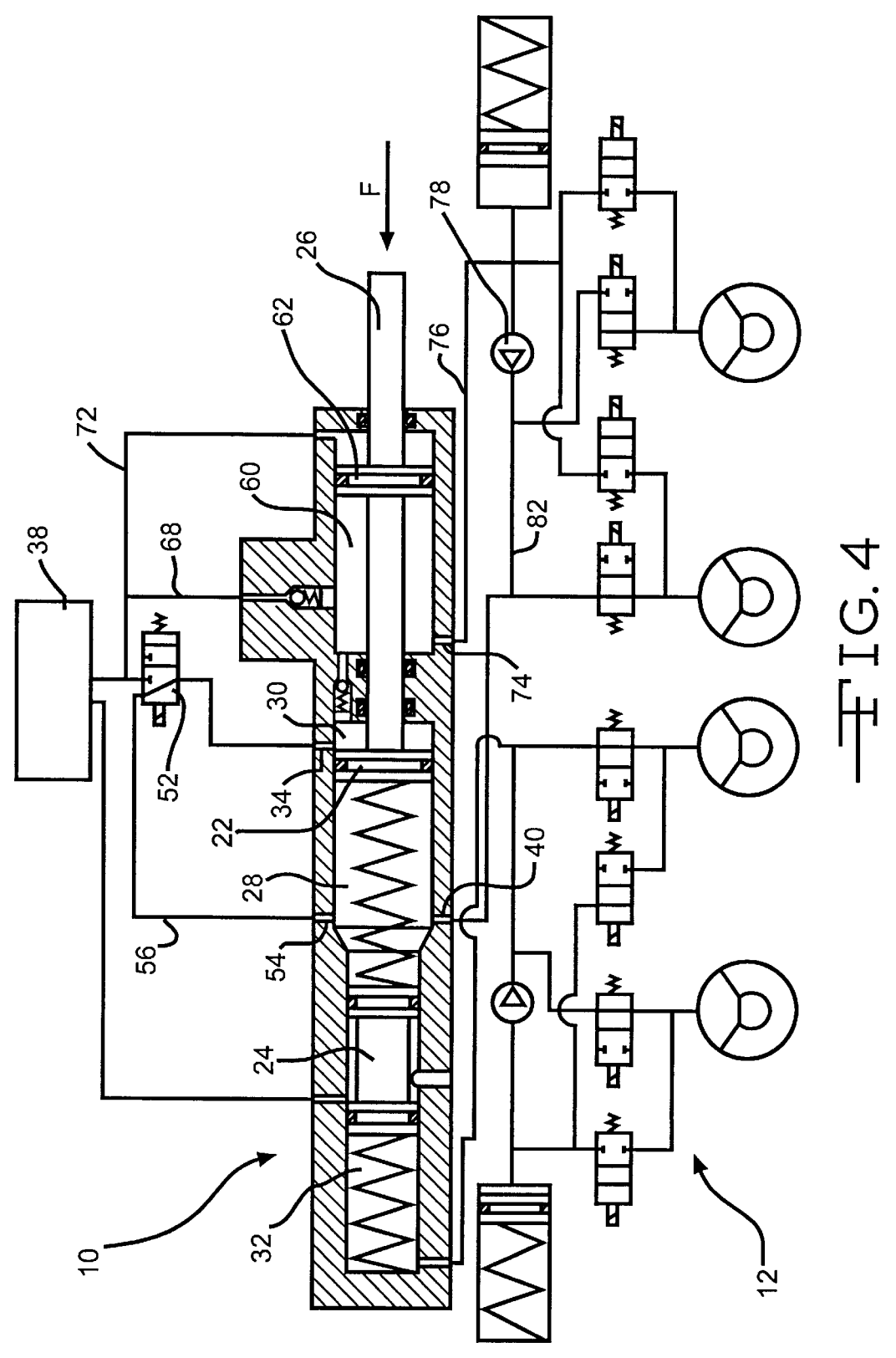

Illustrated in FIG. 3 and FIG. 4 is a modified, second exemplary embodiment of the master cylinder 10, in which, in spite of an optionally possible increase in pressure intensification, no lengthened displacement travel of the piston 22, and therefore no lengthened brake pedal travel, occurs. In the following text, the second exemplary embodiment will be described in more detail only with respect to its differences from the first exemplary embodiment. The main difference comprises a filling stage 58, which is connected upstream of the replenishing chamber 30 and comprises a filling chamber 60, which is made in the housing 18 of the master cylinder 10 and through which the rod-like actuating element 26 passes, and a filling piston 62 accommodated in said filling chamber. The filling chamber 60, which is likewise filled with hydraulic fluid when the master cylinder 10 is ready to operate, has a fluid connection to the replenishing chamber 30 via a connecting line 64 and a nonreturn valve 66 that is arranged therein and opens in the actuating direction of the master cylinder. A line 68, in which there is arranged a nonreturn valve 70 that blocks in the actuating direction of the master cylinder, as well as a further line 72, connect the filling chamber 60 to the supply container 38 for hydraulic fluid. Furthermore, the filling chamber 60 has a fluid connection, via a filling chamber outlet 74 and an adjoining line 76, to a fluid reservoir 80 that is assigned to the suction side of a hydraulic pump 78. The delivery side of the hydraulic pump 78 is connected by way of a line 82 to the pressure chamber outlet 40 of the first pressure chamber 28.

The filling piston 62 is fastened to the actuating element 26 or formed integrally with the latter, and is coupled via said actuating element to the primary piston 22 for the purpose of common displacement. As illustrated, the filling piston 62 has a hydraulically active area C which corresponds to the difference between the hydraulically active area A of the primary piston 22 and the hydraulically active area B of the actuating element 26.

The functioning of the filling stage 58 of the second exemplary embodiment will now be described, it being initially assumed that the valve 52 is, according to FIG. 3, in a position in which the line 36 can be passed through, so that the replenishing chamber 30 is connected to the supply container 38. As soon as an input force F acts on the actuating element 26, the filling piston 62 coupled to the latter is displaced to the left in the filling chamber 60, as a result of which a corresponding volume of fluid is transferred out of the filling chamber 60, through the connecting line 64, into the replenishing chamber 30. After the input force F has fallen away, the primary piston 22 and the filling piston 62 connected to it are jointly displaced to the right, with respect to FIG. 3. The nonreturn valve arranged in the connecting line 64 closes, whereas the nonreturn valve 70 arranged in the line 68 opens because of the negative pressure produced in the filling chamber 60, so that hydraulic fluid can then flow from the supply container 38 into the filling chamber 60. The additional fluid volume of the filling stage 58 is thus only displaced physically in the first position of the valve 52, and remains inactive.

If, however, the valve 52 is in its second position, as illustrated in FIG. 4, a specific fluid volume is displaced out of the first pressure chamber 28 into the replenishing chamber 30, as in the first exemplary embodiment, and a pressure which corresponds to the pressure in the first pressure chamber 28 is established in the replenishing chamber 30. Therefore, the volume of fluid to be forced out of the filling chamber 60, on account of the movement of the filling piston 62 which takes place together with the primary piston 22, is no longer transferred through the connecting line 64 into the replenishing chamber 30, but through the filling chamber outlet 74 and the adjoining line 76 into the fluid reservoir 80, which was empty at the beginning of the actuating operation of the master cylinder 10.

The hydraulic pump 78 then delivers the fluid volume contained in the fluid reservoir 80 virtually without delay into the first pressure chamber 28 via the line 82 and the pressure chamber outlet 40. There is therefore always the same volume of fluid available in the first pressure chamber 28, irrespective of the position of the valve 52. In spite of the increase in pressure intensification connected in in the second position of the valve 52, the displacement travel of the primary piston 22 is therefore not lengthened. In the case of the second exemplary embodiment, the braking pressure produced in the first pressure chamber 28 is therefore furnished partly by the capacity of the hydraulic pump 78 and partly by the input force F, which is converted into fluid pressure via the hydraulically active area B of the actuating element 26.

The hydraulic pump 78 is designed such that its delivery capacity is not restricted by the braking pressure that builds up in the first pressure chamber 28 within the context of an actuation of the master cylinder 10. It is therefore always able to deliver the volume of fluid in the fluid reservoir 80 into the pressure chamber 28. Furthermore, the hydraulic pump 78 is of the non self-priming type, so that it is able to deliver into the pressure chamber 28 only that volume of fluid which is forced from the filling chamber 60 into the fluid reservoir 80 during an actuation of the master cylinder.

What is claimed is:

1. Master cylinder for a vehicle hydraulic braking system, having a housing and a bore formed therein in which a piston is guided in a sealing and displaceable manner and is mechanically connected to a rod-like actuating element, with which an input force can be transmitted to the piston for pressure intensification, said piston defining, in the bore, a pressure chamber and a replenishing chamber arranged on the actuating element side, the piston having a hydraulically active area A and the actuating element having a hydraulically active area B<A, characterized by a device which selectively provides a fluid connection between the pressure chamber and the replenishing chamber, as a result of which, when the pressure chamber and replenishing chamber are connected to each other, the pressure intensification of the master cylinder is increased by the factor A/B.

2. Master cylinder according to claim 1, characterized in that the device for providing a fluid connection between the pressure chamber and replenishing chamber comprises an electrically actuatable valve, which selectively blocks or clears the connection between the pressure chamber and the replenishing chamber.

3. Master cylinder according to claim 1, characterized in that a filling stage, which comprises a filling chamber and a filling piston, is connected upstream of the replenishing chamber, the filling piston having a hydraulically active area C=A−B and the filling chamber having a fluid connection, on the one hand, to the replenishing chamber via a nonreturn valve that opens in the actuating direction of the master cylinder, and, on the other hand, to a fluid reservoir assigned to the inlet side of a hydraulic pump, whose delivery side has a fluid connection to the pressure chamber.

4. Master cylinder according to claim 3, characterized in that the hydraulic pump is able to deliver into the pressure chamber only that volume of fluid which is forced from the filling chamber into the fluid reservoir during an actuation of the master cylinder.

5. Master cylinder according to claim 4, characterized in that the hydraulic pump is of the non self-priming type.

6. Master cylinder according to claim 3, characterized in that the filling piston is coupled to the piston via the actuating element.

7. Master cylinder according to claim 1, characterized in that a second piston, which is designed as a floating piston, is guided in a sealing and displaceable manner in the bore and, in the latter, bounds a second pressure chamber.

8. Master cylinder according to claim 1, characterized in that a brake booster that can be actuated independently of the driver is coupled to the actuating element.

9. Master cylinder according to claim 8, characterized in that the device for providing a fluid connection between pressure chamber and replenishing chamber comprises a control device which, if the brake booster is actuated independently of the driver, outputs a signal to establish the fluid connection between pressure chamber and replenishing chamber.

* * * * *

UNITED STATES PATENT AND TRADEMARK OFFICE
CERTIFICATE OF CORRECTION

PATENT NO. : 5,970,710
DATED : October 26, 1999
INVENTOR(S) : Werner Dieringer

It is certified that error appears in the above-identified patent and that said Letters Patent is hereby corrected as shown below:

On the Title page, insert item [30] to read --
May 20, 1996 [D].....................Germany 19620228--.

Signed and Sealed this

Thirteenth Day of February, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,970,710
DATED : October 26, 1999
INVENTOR(S) : Werner Dieringer

It is certified that error appears in the above-identified patent and that said Letters Patent is hereby corrected as shown below:

In Item [73] of the cover page, please change the name of the assignee from "Lucas Varity public limited company, United Kingdom" to --Lucas Industries public limited company, United Kingdom--.

Signed and Sealed this

Fifteenth Day of May, 2001

Attest:

NICHOLAS P. GODICI

Attesting Officer     Acting Director of the United States Patent and Trademark Office